United States Patent [19]

Hudis et al.

[11] Patent Number: 5,615,078
[45] Date of Patent: Mar. 25, 1997

[54] METALLIZED FILM FOR ELECTRICAL CAPACITORS HAVING A SEMICONDUCTIVE LAYER EXTENDING ENTIRELY ACROSS THE UNMETALLIZED MARGIN

[75] Inventors: Martin Hudis, Mattapoisett, Mass.; Mamoru Koebisu, Furutakacho-Moriyamashi; Kenji Hatada, Shiga, both of Japan

[73] Assignees: Aerovox Incorporated, New Bedford, Mass.; Toray Industries, Inc, Japan; Toray Plastics America, Inc., North Kingstown, R.I.

[21] Appl. No.: 357,376

[22] Filed: Dec. 16, 1994

[51] Int. Cl.⁶ .............................. H01G 4/06; H01G 4/008
[52] U.S. Cl. .................. 361/313; 361/301.5; 361/306.3; 361/321.2; 361/322; 361/312; 361/305
[58] Field of Search ........................ 361/305, 273, 361/306, 307, 308, 309, 321.1–321.5, 310–313; 29/25.42

[56] References Cited

U.S. PATENT DOCUMENTS

| | | | |
|---|---|---|---|
| 3,214,657 | 1/1963 | Davis | 361/273 |
| 3,298,864 | 8/1965 | Maylandt | 361/273 |
| 3,940,667 | 2/1976 | Pearce | 317/230 |
| 4,729,058 | 3/1988 | Gupta et al. | 361/321 |
| 4,771,362 | 9/1988 | Behn | 361/306 |
| 4,811,164 | 3/1989 | Ling et al. | 361/321 |
| 4,813,116 | 3/1989 | Thiel et al. | 29/25.42 |
| 4,868,711 | 9/1989 | Hirama et al. | 361/321 |
| 4,891,684 | 1/1990 | Nishioka et al. | 357/51 |
| 5,021,921 | 6/1991 | Sano et al. | 361/321 |
| 5,051,862 | 9/1991 | Pageaud et al. | 361/308 |
| 5,144,522 | 9/1992 | Marsh | 361/306 |

FOREIGN PATENT DOCUMENTS

| | | |
|---|---|---|
| 50-8050 | 1/1975 | Japan . |
| 50-45264 | 4/1975 | Japan . |
| 50-85860 | 7/1975 | Japan . |
| 50-85861 | 7/1975 | Japan . |
| 51-22735 | 2/1976 | Japan . |
| 51-84061 | 7/1976 | Japan . |
| 53-22040 | 2/1978 | Japan . |
| 53-96466 | 8/1978 | Japan . |
| 54-45946 | 3/1979 | Japan . |
| 4-36569 | 9/1985 | Japan . |

Primary Examiner—Michael W. Phillips
Assistant Examiner—Anthony Dinkins
Attorney, Agent, or Firm—Fish & Richardson P.C.

[57] ABSTRACT

A film capacitor in which the unmetallized margin is provided with a semiconductive layer. The layer provides a parallel resistive path within the capacitor, itself, obviating the need for an external resistor. It also grades the electric field across the margin, i.e., makes the field more uniform, thus allowing the margin to be made narrower without electrical breakdown, permitting a reduction in the physical size of the capacitor. A refractory, semiconductive layer is provided between the metal layer and the dielectric film. The refractory layer accelerates the self-clearing process, by insulating the underlying dielectric film from the heat generated by the vaporizing metal, thus hastening vaporization and reducing the tendency of the dielectric film to carbonize. As a result, faults are cleared with substantially less energy consumption. Preferably, the refractory layer is also semiconductive, to reduce field emission effects, and thereby decrease the frequency of faults in the dielectric film.

30 Claims, 6 Drawing Sheets

5,615,078

METALLIZED FILM FOR ELECTRICAL CAPACITORS HAVING A SEMICONDUCTIVE LAYER EXTENDING ENTIRELY ACROSS THE UNMETALLIZED MARGIN

BACKGROUND OF THE INVENTION

This invention relates to metallized film for electrical capacitors.

Referring to FIG. 1, film capacitors are typically constructed by overlaying a pair of metallized films 1, 2 with a slight sideways displacement before winding the films to form a capacitor core. Opposite ends of the core are sprayed with a metal to form electrical terminals 4. The electrical terminals are soldered to wires forming the capacitor's external electrical contacts. The capacitor core is then immersed in a dielectric liquid within a housing.

Each metallized film comprises a very thin layer of metal 3 (e.g., zinc) deposited on a dielectric film 3b (e.g., polypropylene). The metal layer typically covers the entire surface of the dielectric film except along one longitudinal edge (the "unmetallized margin" 5). The unmetallized margin maintains electrical isolation between the metal layers on metallized films 1, 2, and ensures that each terminal 4 comes into contact with only one metallized film.

Standard setting organizations have long required that film capacitors include a resistor connected in parallel (the "UL resistor"). This is conventionally provided, at significant manufacturing cost, by attaching a separate resistor on the outside of the capacitor housing.

The ability of a film capacitor to store electrical energy is limited by the electric field strength that can safely be applied across the dielectric film. In recent years, there has been a demand to operate metallized film capacitors at higher electric fields (or voltages) and to miniaturize the capacitors by using thinner films (which also increases the strength of internal electrical fields in the capacitor). However, as the field strength rises, the frequency of dielectric faults in the capacitor increases.

A dielectric fault occurs when the dielectric strength at a particular location is insufficient, and arcing occurs through the dielectric film from one metal layer to the next. A dielectric fault may be the result of, for example, foreign particles entering the capacitor winding or local imperfections in the dielectric film, itself.

Infrequent, isolated faults can be accommodated by a process known as self-clearing or self-healing. The metallizing in the immediate vicinity of the fault is vaporized by the heat generated by the large currents flowing to the site of the fault. Conventional film capacitors operate with an electric field strength (or electrical stress) of between 60 and 84 V/micron. Operating above a capacitor's design field strength will produce faults so frequently that they cannot successfully be cleared, resulting in the capacitor overheating and failing.

During self-clearing, two competing processes are at work. Heat generated by current flowing toward the fault is causing metal to vaporize around the fault, and thus isolate it. But at the same time the heat and arcing in the vicinity of the fault is carbonizing the surrounding dielectric (e.g., creating conductive, carbon tracks), making it conductive, and thereby increasing the flow of current. A capacitor fails when the dielectric faults occur so frequently and so close to one another, and the amount of energy released in the clearing process is so high, that vaporization of metal around the faults does not occur quickly enough to halt the heating and carbonization of the dielectric.

In addition to causing dielectric faults, strong electrical fields may cause arcing, or corona discharges, between a terminal 4 and a metal layer 3 across the unmetallized margin 5 in the capacitor core. The corona discharge causes a deterioration of an edge of the metal layer adjacent the margin, most likely by oxidizing the metal layer. The deterioration progresses gradually inward from the edge, causing a portion of the metal layer to become insulating. The resulting decrease in the area of the metal layer causes a reduction in the capacitance of the capacitor.

The strength and frequency of arcing in the capacitor across the unmetallized margin typically overshadows the effects of dielectric faults in the capacitor, since the breakdown voltage between metal layers in the capacitor is generally much higher than voltages applied to the capacitor. Deterioration due to corona discharge across the margin is thus a limiting factor in operating the capacitor at either high voltages or with thinner films.

Several schemes attempt to prevent arcing across the unmetallized margin by reducing the electric field at the edge of the metal layer adjacent the margin. For example, in Japanese Patent No. 50-8050, the metal layer 3 is made thicker near the unmetallized margin (at 3') (FIG. 2). In another scheme, shown in FIG. 3 and described in Japanese Patent No. 50-85860, a semiconductor layer 7 made of Si or Ge is formed over the edge of the metal layer 3 adjacent the margin 5. In Japanese Patent No. 50-85861 (FIG. 4), an oxidized layer 8 is added between the edge of the metal layer 3 and a semiconductor layer 7. Japanese Patent No. 51-84061 (FIG. 5) describes adding a semiconductor layer 7 at the edge of the metal layer 3 below a high resistance semiconductor layer 9.

In a variation of the above schemes, Japanese Patent No. 50-45264 (FIG. 6) describes a capacitor having a metallized film 10 with a metal layer 3, 12 on each of its surfaces. The metallized film 10 has a central unmetallized margin 5. The second film 11 in the capacitor is non-metallized. An edge of film 11 and metal layer 12 are covered with a semiconductor layer 7, while the central margin 5 remains uncovered.

In all the schemes described above, the semicondutor layer does not extend into the unmetallized margin. As a result, the isolation provided by the unmetallized margin strongly limits the degree to which the electric field at the edge of the margin is reduced by the semiconductor layer.

SUMMARY OF THE INVENTION

In general, in a first aspect, the invention features a new film capacitor in which the unmetallized margin is provided with a semiconductive layer. The layer provides a parallel resistive path within the capacitor, itself, obviating the need for an external resistor. It also grades the electric field across the margin (i.e., makes the field more uniform), thus allowing the margin to be made narrower without electrical breakdown, permitting a reduction in the physical size of the capacitor.

Embodiments of the invention include the following features. The metallized film in the capacitor has a surface resistivity in the range $10^6$ Ω-cm to $10^{14}$ Ω-cm, preferably between $10^8$ Ω-cm and $10^{12}$ Ω-cm. The semiconductive layer is selected from the group including zinc oxide, copper oxide, selenium oxide and carbon. The metallization on the dielectric film has a varying thickness.

In addition, the semiconductive layer may extend over the metallization on the film or between the metallization and the dielectric film.

In a second aspect, the invention features providing a refractory layer intermediate the metal layer and the dielectric film. Preferably, the refractory layer is also semiconductive. The refractory layer accelerates the self-clearing process, by insulating the underlying dielectric film from the heat generated by the vaporizing metal, thus hastening vaporization and reducing the tendency of the dielectric film to carbonize. As a result, faults are cleared with substantially less energy consumption.

If the refractory layer is also semiconductive, it has the further benefit of reducing the frequency of faults in the dielectric, by reducing what is known as field emission. This phenomenon, in which electrons migrate across the film during operation, tends to increase the frequency of faults in the dielectric.

The refractory and semiconductive qualities of the intermediate layer allows a film capacitor to operate at a higher electric field strength in the dielectric, and thus with greater energy storage.

Preferably, the same semiconductive layer provides both aspects of the invention, by extending beneath the metal layer and into the unmetallized margin. A second metal layer (e.g., aluminum or aluminum-zinc alloy) can be provided between the primary metal layer and the dielectric film, and that portion of the second metal layer that is exposed in the unmetallized layer can be oxidized to make it semiconductive (e.g., to create $Al_2O_3$).

The invention thus provides a capacitor that is less vulnerable to severe corona discharges across the unmetallized margin, and thus exhibits only a small capacitance change even when operated at high voltages.

Other features and advantages of the invention will be apparent from the following description of the preferred embodiment and from the claims.

DESCRIPTION OF THE PREFERRED EMBODIMENTS

Figure 7:
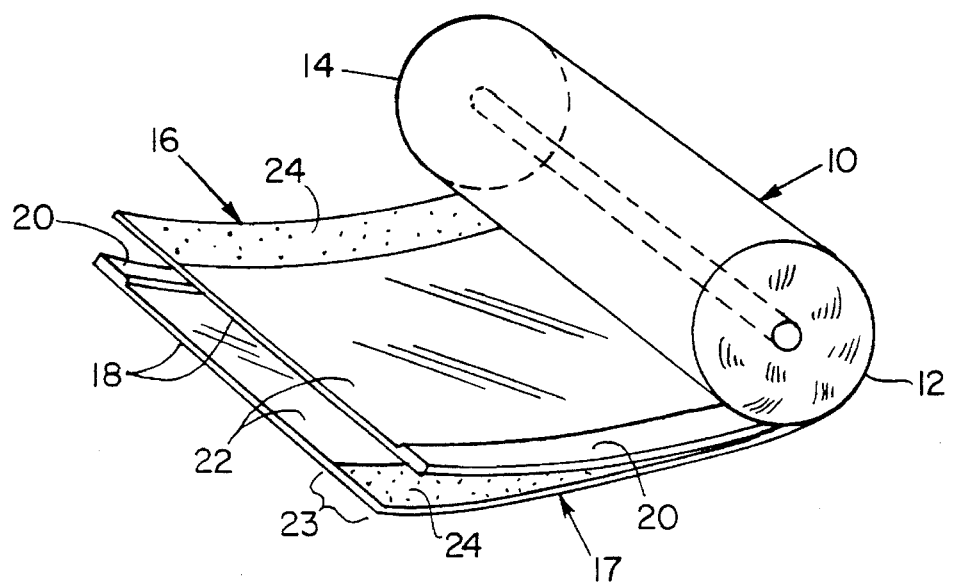
FIG. 7 is a perspective view of a metallized film capacitor core constructed according to the invention (the core is shown partially unwrapped; it is normally installed in a housing, not shown)

Referring to FIG. 7, capacitor core 10 comprises a winding of two metallized films 16, 17 (typically 30 to 125 mm wide). A zinc end spray is applied to each end of the wound capacitor core (at 12, 14), and wires (not shown) for making connections to the capacitor core are soldered to the end sprays. The core is normally installed in a housing, immersed in a dielectric liquid (not shown).

Figure 8:
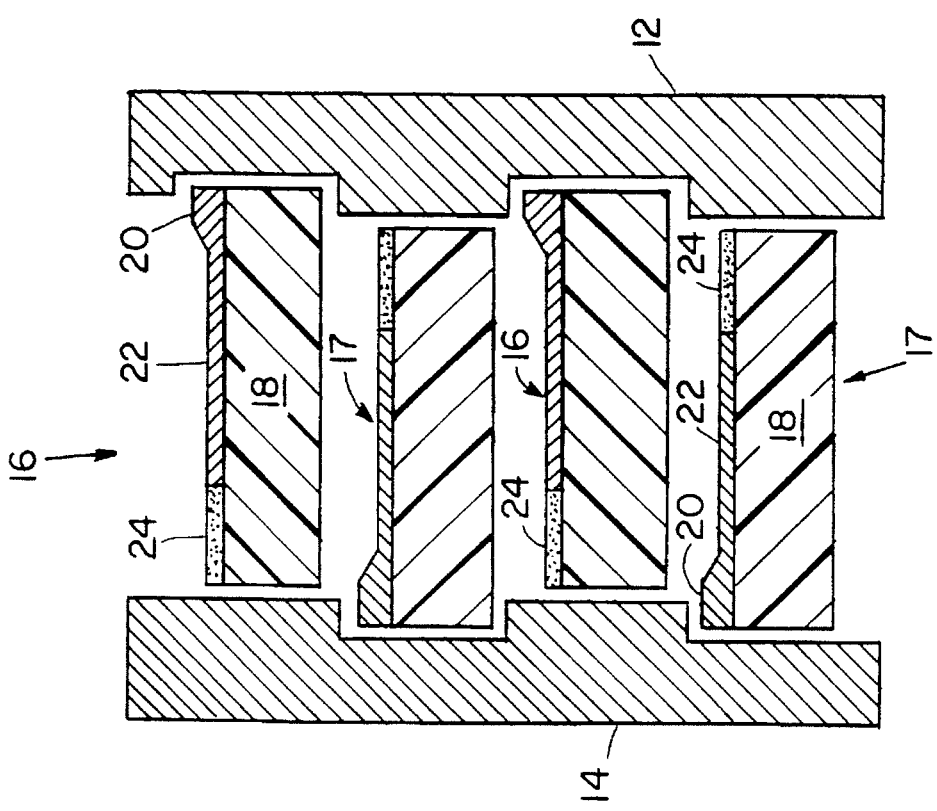
FIG. 8 is a diagrammatic cross-sectional view through the capacitor core of FIG. 7 (with dimensions greatly exaggerated for clarity).

Referring to FIG. 8, each metallized film 16, 17 consists of a polymer film substrate 18 (100 to 300 Angstroms thick). The polymer film is a natural, semi-synthetic, or synthetic high polymer with good dielectric characteristics and a high voltage and temperature tolerance. Examples of such polymers include polyolefin, polyester, polysulfide, polysulfone, polystyrene, fluororesin, a mixture or copolymerized resin of any of the above materials, polypropylene, polyethyleneterephthalate, polyethylenaphthalate, polycarbonate, polystyrene, polyphenylenesulfide, polyphloroethylene, and a copolymerization of tetraphloroethylene and hexaphloropropylene, among other materials.

A thin metal layer 22 overlying the polymer film is formed from a metal with good self-healing characteristics and a high conductivity, such as Al, Cu, Sn, or an Al-Zn alloy. The metal layer is thicker (at 20) along the longitudinal edge adjacent the end spray, to improve the mechanical and electrical connection between the metal and the end spray. This thickened margin 20 is less than 5 mm wide, and has a resistance of from 1 to 3 $\Omega$/sq. The main area of metallization 22 is from 100 to 500 Angstroms in thickness to provide for effective self-healing, and from 4 to 10 $\Omega$/sq. in resistance.

The metal layer covers the entire upper surface of each polypropylene film except along unmetallized margins 23, and extend along opposite longitudinal edges on the two films.

Figure 9:
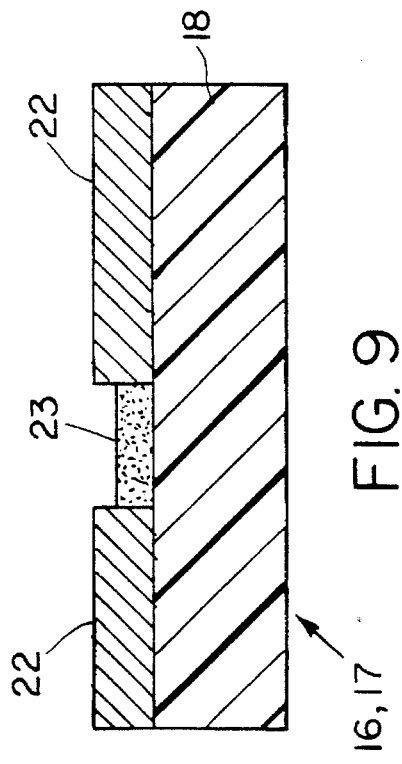
FIG. 9 is a schematic cross-sectional view of another metallized film.

The unmetallized margin may be formed at a variety of positions other than at an edge of the unmetallized film to suit capacitor usage. For example, as shown in FIG. 9, the unmetallized margin may be placed in the center of the metal layer. In addition, a metal layer and an unmetallized margin may be formed on both surfaces of the film.

A semiconductive layer 24 or thin semiconductive film is provided over an entire width of each of the unmetallized margins (FIG. 8). The semiconductor layer can be formed from any of a variety of semiconductors, including organic materials, such as semi-conducting carbon, and inorganic materials, such as a metal oxide. The layer has a surface resistivity of $10^6$ to $10^{14}$ $\Omega$-cm, with a preferred resistivity range between $10^8$ to $10^{12}$ $\Omega$-cm, with a resistance preferably at $3 \times 10^9$ $\Omega$/sq. Semiconductors with a higher surface resistivity may not effectively reduce the electrical field at the edge of the metal layer adjacent the margin. Semiconductors with a lower surface resistivity may have a large dielectric dissipation factor and cause "thermal runaway" in the capacitor.

By covering the entire unmetallized margin, the semiconducting film provides a significant reduction of the electric field at the edge of the metal layer. In addition, the semiconductor layer electrically connects the metal layer to the sprayed ends, and thus forms a resistance connected in parallel to the capacitor. This eliminates the need for installing a discharge resistor in parallel to the capacitor.

Figure 1:
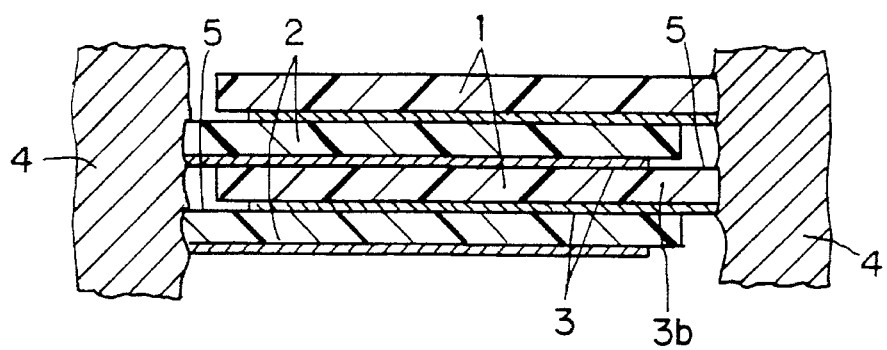
FIGS. 1 through 6 are schematic cross-sectional views of various prior art metallized film capacitors.
Figure 2:
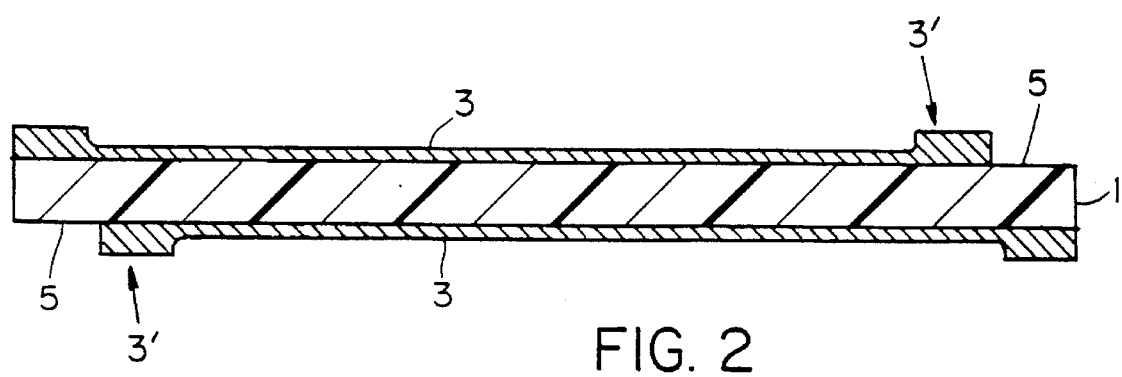
Figure 3:
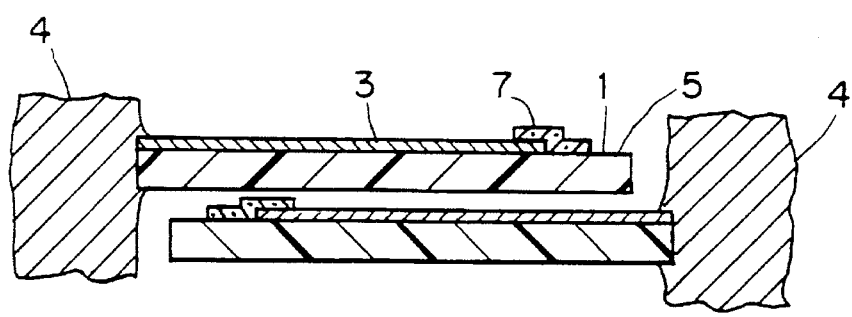
Figure 4:
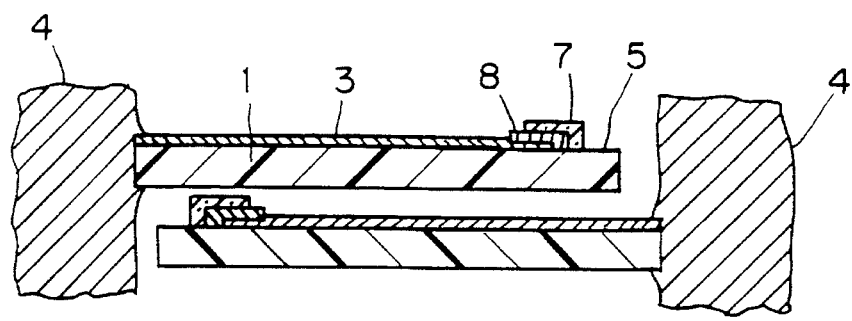
Figure 5:
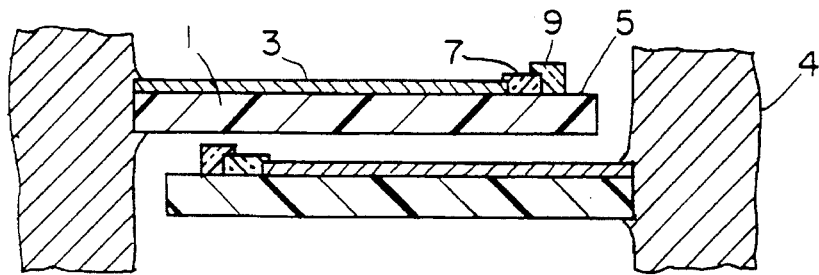
Figure 6:
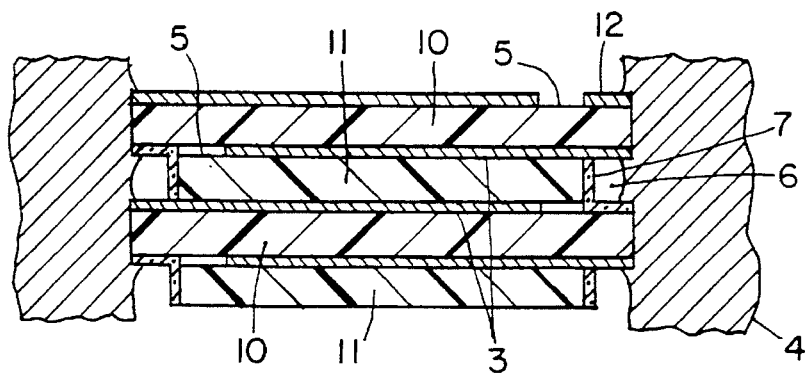

As shown diagrammatically in FIG. 8, the metallized films 16, 17 alternate in the wound core, so that all of the thickened margins 20 of film 16 are in contact with end spray 12, and similarly all of the thickened margins 20 of film 17 are in contact with end spray 14. The films 16, 17 are offset to improve the contact between the thickened margins 20 and the end sprays 12, 14. (For clarity, the end sprays are shown in FIGS. 2, 12, and 13 as not contacting the metallized films, but, of course, there is contact.)

The metallized films are formed generally by vapor depositing a metal onto the polymer layer by using one of various metal heating techniques, including resistance heating of boats, induction heating, and electron beam heating. An organic semiconductor is then coated or vapor deposited onto the unmetallized margin. Alternatively, a metal or metal oxide semiconductor may be vapor deposited or plasma sprayed onto the margin.

Figure 10:
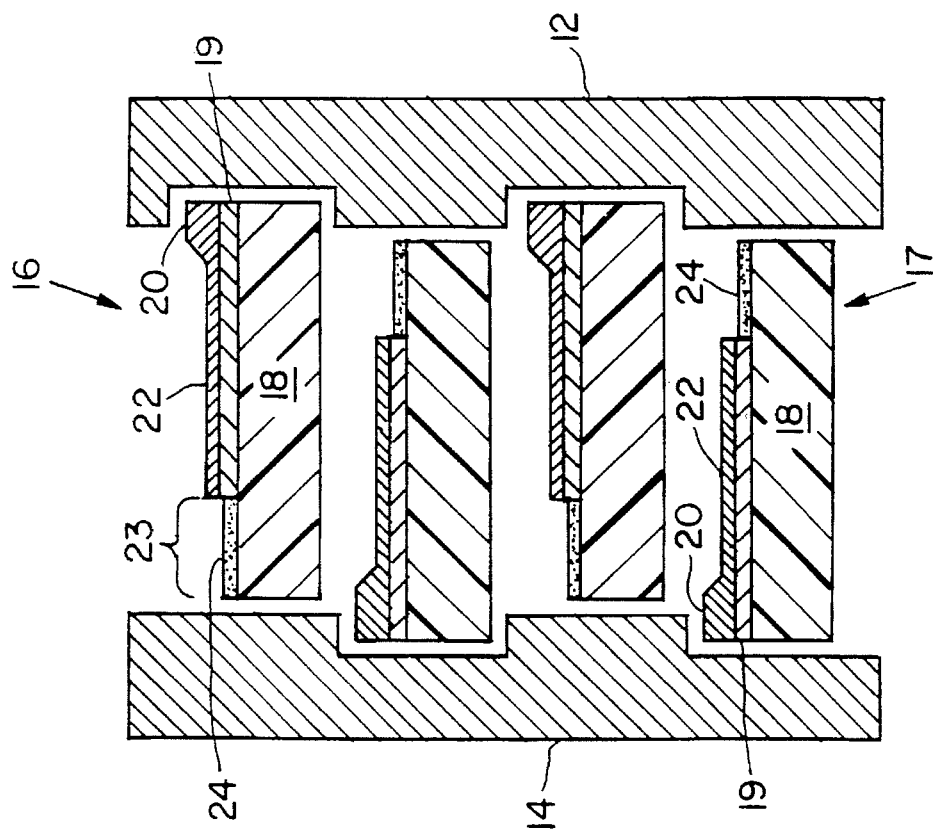
FIGS. 10 and 11 are diagrammatic cross-sectional views of two other preferred embodiments of a capacitor.
Figure 12:
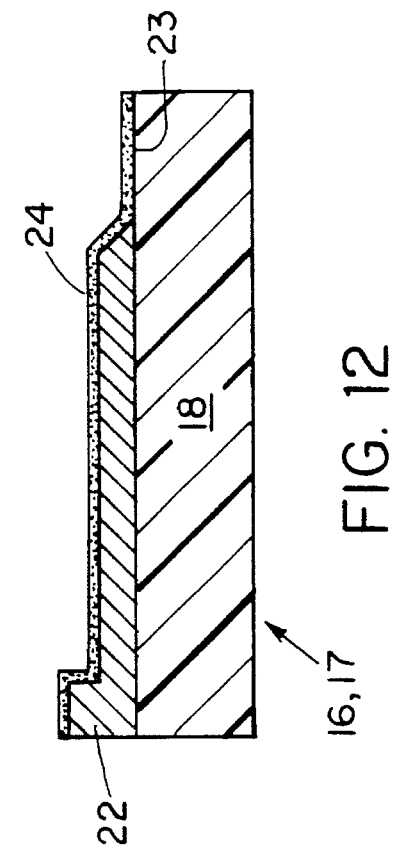
FIG. 12 is a schematic cross-sectional view of another metallized film.
Figure 11:
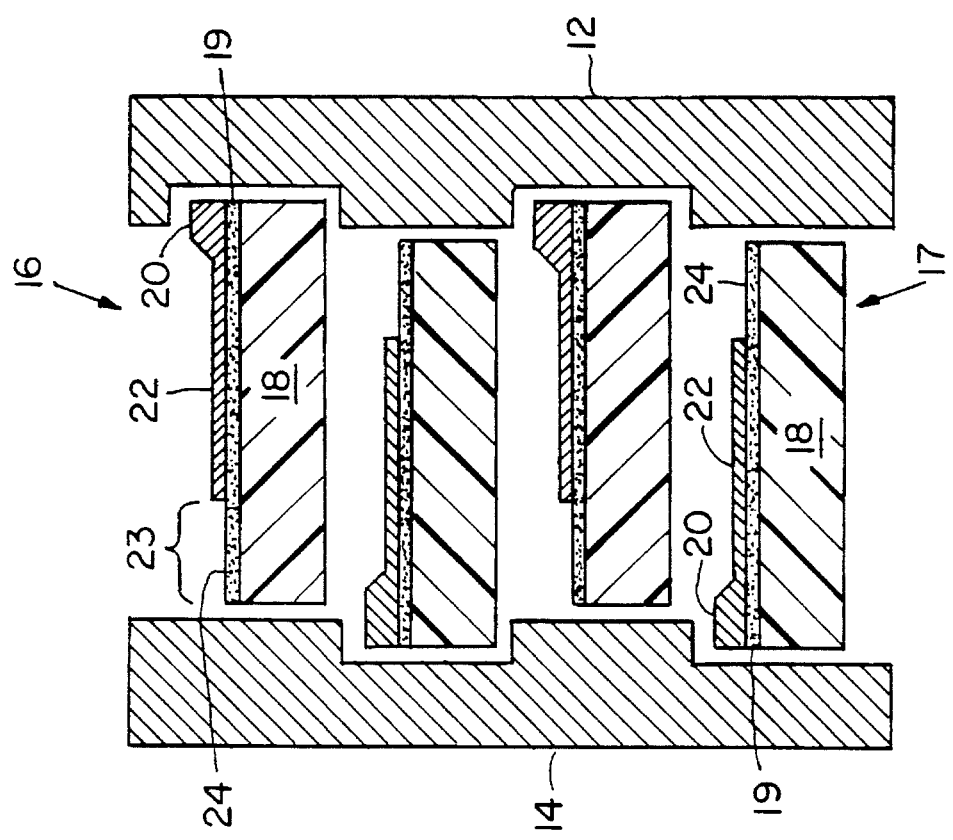
Figure 13:
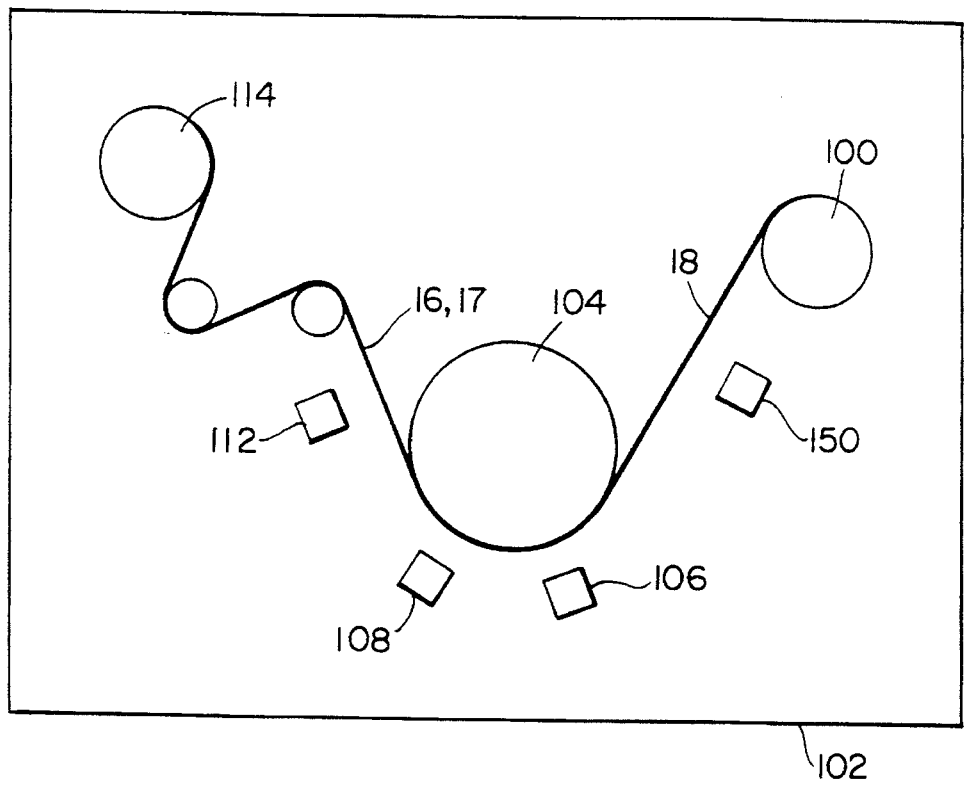
FIG. 13 is a representation of a manufacturing process for the metallized films.

FIGS. 10, 11 and 12 show other preferred embodiments of the invention. As shown in FIG. 10, an intermediate layer 19 may be formed between metal layer 22 and dielectric film 18. The intermediate layer 19 is formed by depositing a first metal (e.g., aluminum) across the full width of dielectric film 18. The intermediate layer is deposited with a mask causing the layer to be thinner at the unmetallized margin. Then, a second layer of metal 22 (e.g., zinc) is metallized onto the intermediate layer 19, except at the unmetallized margin 23, where intermediate layer 19 is exposed. The exposed area of the intermediate layer is then oxidized to create semiconductive layer 24 (e.g., $Al_2O_3$). For example, if aluminum is used for the intermediate layer, aluminum oxide is formed at layer 24.

Alternatively, as shown in FIG. 11, the intermediate layer 19 may be oxidized prior to applying the second metal, so that semiconductive layer 24 extends across the full width of the film, between dielectric film 18 and metal layer 22.

The intermediate layer of FIG. 11 has both refractory and semiconductive qualities. Its refractory nature accelerates the self-clearing process, by insulating the underlying dielectric film from the heat generated by the vaporizing metal, thus hastening vaporization and reducing the tendency of the dielectric film to carbonize. As a result, faults are cleared with substantially less energy consumption. The semiconductive quality of the layer provides the further benefit of reducing the frequency of faults in the dielectric, by reducing what is known as field emission. This phenomenon, in which electrons migrate across the film during operation, tends to increase the frequency of faults in the dielectric.

Alternatively, as shown in FIG. 12, the metal layer 22 is first deposited over the entire polymer film 18 except at the unmetallized margin 23. An extremely thin film of metal or metal oxide semiconductor 24 with a high melting temperature is then deposited on all or part of the metal layer. The same vapor deposition apparatus can be used to deposit both the metal and the semiconductor layer onto the polymer film with, for example, electron beam heating or sputtering techniques.

Figure 14:
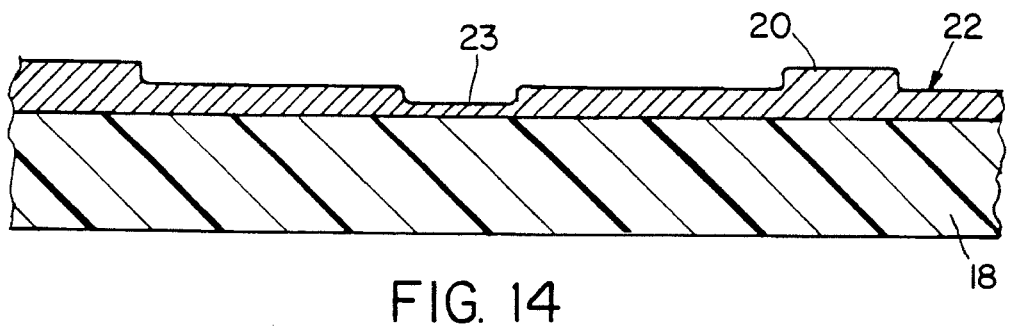
FIG. 14 is a schematic cross-sectional view of a partially constructed metallized film.

An example of a metallized film manufacturing process, shown in FIG. 13, begins by unwinding a polymer film 18 from a roll 100 in a vacuum metallizer 102 onto a second roll 104. Al from a resistance heated boat 106 is then deposited at a controlled metallization rate over the entire width of the polymer film. Next, Zn from a Zn crucible 108 is vapor deposited at a controlled deposition rate over the entire width of the film to form a Zn-Al alloy layer 22 (FIG. 14). The thickness of the alloy layer is adjusted by using a mask installed at the Zn crucible. For example, referring to FIG. 14, the alloy layer is made thick at an edge 20 for better contact with the sprayed ends, while margin 23 remains thin.

Figure 15:
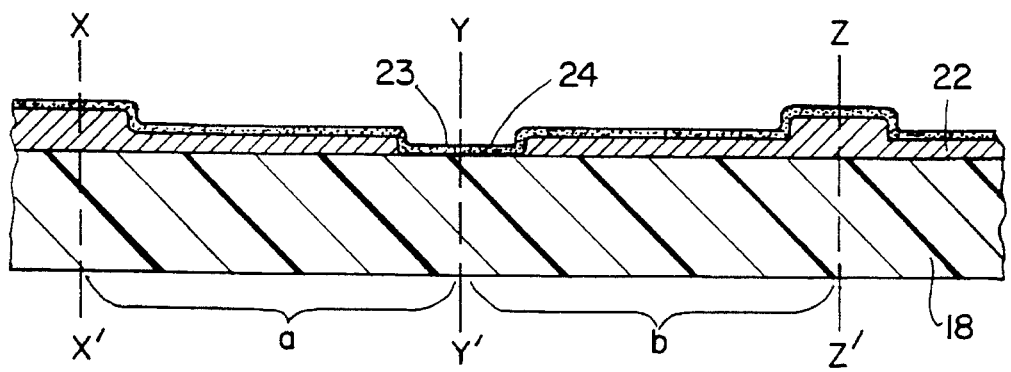
FIG. 15 is a schematic cross-sectional view of a finished metallized film.

Next, referring again to FIG. 13, oxidizer 112 oxidizes the alloy layer with an oxygen, ozone, or oxygen gas plasma created by glow discharge in a low temperature plasma. As shown in FIG. 15, the oxidation forms a semiconducting thin film 24 over the metal layer. The metallized film 16, 17 is then wound up continuously on roll 114.

The metallized film is then slit at X—X', Y—Y', Z—Z' to produce two sections (a) and (b). The (a) and (b) sections are laid on top of one another with a slight relative displacement sideways, and then wound to form a capacitor element. The capacitor element is then sprayed with a metal at its ends, heat treated, attached to electrical wires, cased, impregnated with oil and then sealed to form a capacitor in a conventional manner.

Figure 16:
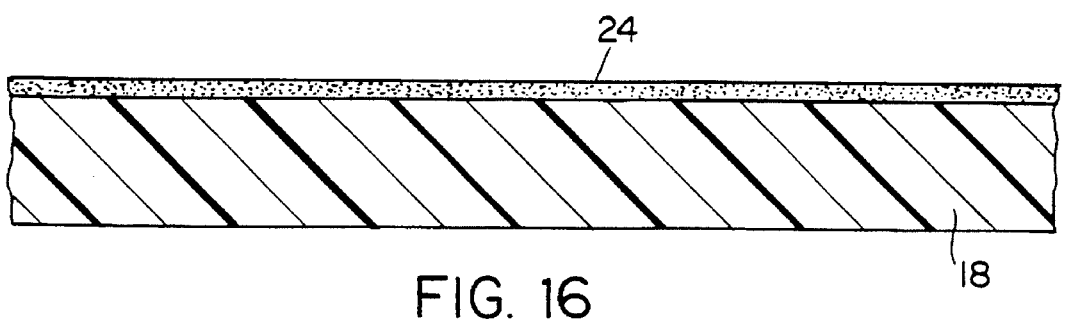
FIG. 16 is a schematic cross-sectional view of another partially constructed metallized film.
Figure 17:
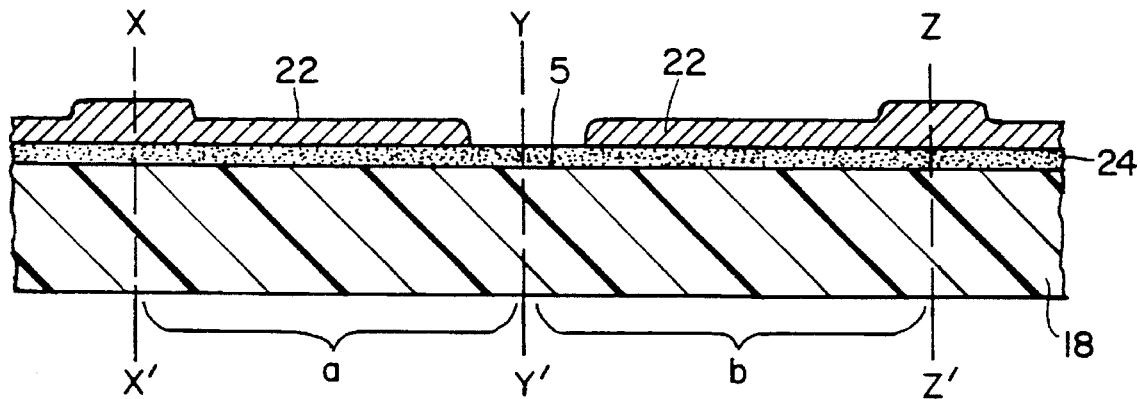
FIG. 17 is a schematic cross-sectional view of the metallized film of FIG. 16 when fully formed.

Alternatively, as seen in FIGS. 13, 16 and 17, polymer film 18 is first unwound from roll 100 and covered with an Al oxide semiconducting layer 24. This is achieved by depositing Al from boat 106 onto the film 18 while pumping oxygen into the vacuum metallizer 102. The polymer film is then removed from the vacuum metallizer, replaced on roll 100, and pulled under an oil sprayer 150. The oil sprayer deposits a layer of oil on the semiconductor layer at the margin 23. Zn is then deposited on the semiconductor layer from Zn crucible 108 to form metal layer 22. The oil layer prevents Zn from being deposited on the margin. The metallized film is then cut into two sections (a) and (b) and assembled into a capacitor in the manner described above.

Other embodiments are within the following claims. For example, the intermediate layer may consist of acrylate layer on a low crystalline density polypropylene. Additional intermediate layers could also be provided. Although a wound capacitor core is shown (and the claims refer to a wound core), the claims are intended to cover wound as well as stacked capacitor cores (in which sheets of metallized film are stacked).

What is claimed is:

1. A metallized film for use in a capacitor, said metallized film comprising:

a dielectric film;

a first metal layer deposited over the dielectric film, said first metal layer being sufficiently thin to be self-healing upon occurrence of a fault in the dielectric film;

an unmetallized margin extending along the dielectric film; and a semiconductive layer extending entirely across the unmetallized margin to provide a resistive path across the margin.

2. A metallized film capacitor, comprising a wound capacitor core constructed using at least two metallized films, each comprising:

a dielectric film;

a first metal layer deposited over the dielectric film, said first metal layer being sufficiently thin to be self-healing upon occurrence of a fault in the dielectric film;

an unmetallized margin extending along the dielectric film, the margins on the two films being located on opposite edges; and a semiconductive layer extending entirely across the unmetallized margin to provide a resistive path across the margin and thereby provide a parallel resistive path within the capacitor.

3. The subject matter of claim 1 or 2 wherein the semiconductive layer has a surface resistivity in the range of $10^6$ Ω-cm to $10^{14}$ Ω-cm.

4. The subject matter of claim 3 wherein the semiconductive layer has a surface resistivity in the range of $10^8$ Ω-cm to $10^{12}$ Ω-cm.

5. The subject matter of claim 1 or 2 wherein the semiconductive layer comprises a material selected from the group of zinc oxide, copper oxide, selenium oxide and carbon.

6. The subject matter of claim 1 or 2 wherein the first metal layer has a varying thickness.

7. The subject matter of claim 6 wherein th first metal layer is thicker at a longitudinal edge of the first metal layer.

8. The subject matter of claim 1 or 2 wherein the semiconductive layer extends over the first metal layer.

9. The subject matter of claim 8 wherein the semiconductive layer coats an entire surface of the first metal layer.

10. The subject matter of claim 1 or 2 wherein the semiconductive layer extends between the dielectric film and the first metal layer.

11. The subject matter of claim 1 or 2 wherein the semiconductive layer is deposited over an entire surface of the dielectric film, the first metal layer being deposited over the semiconductive layer except at the unmetallized margin.

12. The subject matter of claim 1 or 2 wherein the unmetallized margin extends along a longitudinal edge of the dielectric film.

13. The subject matter of claim 1 or 2 wherein the semiconductive layer abuts one longitudinal edge of the first metal layer, without extending beneath the first metal layer.

14. The subject matter of claim 1 or 2 wherein the semiconductive layer comprises an oxide of the same metal used for the first metal layer.

15. The subject matter of claim 14 wherein the semiconductive layer has been formed by oxidizing a portion of the first metal layer after the first metal layer is deposited on the dielectric film.

16. The subject matter of claim 1 or 2 further comprising a second metal layer deposited between the first metal layer and the dielectric film and extending into the unmetallized margin in which area the second metal layer has been oxidized to provide the semiconductive layer.

17. The subject matter of claim 1 or 2 wherein a main area of metallization of the metal layer is between 100 and 500 Angstroms thick.

18. The subject matter of claim 1 or 2 wherein the semiconductive layer extends across substantially the entire area of the unmetallized margin.

19. A metallized film for use in a capacitor, said metallized film comprising:

a dielectric film;

a first metal layer deposited over the dielectric film, said first metal layer being sufficiently thin to be self-healing upon occurrence of a fault in the dielectric film;

an unmetallized margin extending along the dielectric film; and a refractory layer intermediate the first metal layer and the dielectric film, the refractory layer extending beneath substantially the entire area of the metal layer and the material of the refractory layer being selected to insulate the dielectric film from heat generated in the first metal layer during a clearing event.

20. A metallized film capacitor, comprising a wound capacitor core constructed using at least two metallized films, each comprising:

a dielectric film;

a first metal layer deposited over the dielectric film, said first metal layer being sufficiently thin to be self-healing upon occurrence of a fault in the dielectric film;

an unmetallized margin extending along the dielectric film, the margins on the two films being located on opposite edges; and a refractory layer intermediate the first metal layer and the dielectric film, the refractory layer extending beneath substantially the entire area of the metal layer and the material of the refractory layer being selected to insulate the dielectric film from heat generated in the first metal layer during a clearing event.

21. The subject matter of claim 19 or 20 wherein the refractory layer is semiconductive in regions intermediate the first metal layer and the dielectric film, with the semiconductive nature of the layer being such as to reduce the frequency of faults in the dielectric film.

22. The subject matter of claim 21 wherein the refractory, semiconductive layer extends into the unmetallized margin.

23. The subject matter of claim 21 wherein the refractory, semiconductive layer extends across the unmetallized margin to provide a resistive path across the margin.

24. The subject matter of claim 21 wherein the refractory, semiconductive layer extends across substantially the entire area of the dielectric film.

25. The subject matter of claim 19 or 20 wherein the refractory layer has a surface resistivity in the range of $10^6$ $\Omega$-cm to $10^{14}$ $\Omega$-cm.

26. The subject matter of claim 25 wherein the refractory layer has a surface resistivity in the range of $10^8$ $\Omega$-cm to $10^{12}$ $\Omega$-cm.

27. The subject matter of claim 19 or 20 wherein the refractory layer comprises a material selected from the group of zinc oxide, copper oxide, selenium oxide and carbon.

28. The subject matter of claim 19 or 20 wherein the first metal layer has a varying thickness.

29. The subject matter of claim 25 wherein the first metal layer is thicker at a longitudinal edge of the first metal layer.

30. The subject matter of claim 19 or 20 wherein the unmetallized margin extends along a longitudinal edge of the dielectric film.

* * * * *

UNITED STATES PATENT AND TRADEMARK OFFICE
CERTIFICATE OF CORRECTION

PATENT NO. : 5,615,078
DATED : March 25, 1997
INVENTOR(S) : Martin Hudis, Mamoru Koebisu, and Kenji Hatada It is certified that error appears in the above-identified patent and that said Letters Patent is hereby corrected as shown below:

Cover page, under [73] Assignees, "Toray Industries, Inc" should be --Toray Industries, Inc; --.

Column 8, line 48, "claim 25" should be --claim 28--.

Signed and Sealed this

Fourteenth Day of October, 1997

*Attest:*

BRUCE LEHMAN

*Attesting Officer*  Commissioner of Patents and Trademarks